US010655023B2

(12) United States Patent
Gelling et al.

(10) Patent No.: US 10,655,023 B2
(45) Date of Patent: May 19, 2020

(54) ELECTRODEPOSITION SYSTEM

(71) Applicant: Valspar Sourcing, Inc., Minneapolis, MN (US)

(72) Inventors: Victoria J Gelling, Medina, MN (US); Tapan DebRoy, Victoria, MN (US); Chun Ren, Wilmington, DE (US)

(73) Assignee: The Sherwin Williams Company, Cleveland, OH (US)

( * ) Notice: Subject to any disclaimer, the term of this patent is extended or adjusted under 35 U.S.C. 154(b) by 213 days.

(21) Appl. No.: 15/672,553

(22) Filed: Aug. 9, 2017

(65) Prior Publication Data
US 2017/0335120 A1 Nov. 23, 2017

Related U.S. Application Data

(63) Continuation of application No. PCT/US2016/017323, filed on Feb. 10, 2016.

(60) Provisional application No. 62/114,228, filed on Feb. 10, 2015.

(51) Int. Cl.
| | | |
|---|---|---|
| C09D 5/44 | (2006.01) | |
| C08G 18/80 | (2006.01) | |
| B01J 23/18 | (2006.01) | |
| C08G 18/22 | (2006.01) | |
| C09D 7/40 | (2018.01) | |
| C08G 59/68 | (2006.01) | |
| C09D 7/61 | (2018.01) | |
| C09D 175/04 | (2006.01) | |
| C08G 18/76 | (2006.01) | |
| C25D 13/12 | (2006.01) | |
| C08G 59/06 | (2006.01) | |
| C08G 18/32 | (2006.01) | |
| C08G 59/40 | (2006.01) | |
| C08G 59/24 | (2006.01) | |
| C09D 163/00 | (2006.01) | |
| B01J 37/02 | (2006.01) | |
| B01J 37/34 | (2006.01) | |
| C08G 18/58 | (2006.01) | |
| C08G 18/28 | (2006.01) | |
| C08K 3/11 | (2018.01) | |
| C25D 13/20 | (2006.01) | |
| C08K 3/08 | (2006.01) | |
| C08K 3/22 | (2006.01) | |
| C08K 3/24 | (2006.01) | |

(52) U.S. Cl.
CPC .............. *C09D 5/448* (2013.01); *B01J 23/18* (2013.01); *B01J 37/0215* (2013.01); *B01J 37/0225* (2013.01); *B01J 37/348* (2013.01); *C08G 18/22* (2013.01); *C08G 18/227* (2013.01); *C08G 18/282* (2013.01); *C08G 18/3206* (2013.01); *C08G 18/58* (2013.01); *C08G 18/584* (2013.01); *C08G 18/7621* (2013.01); *C08G 18/7664* (2013.01); *C08G 18/80* (2013.01); *C08G 18/8029* (2013.01); *C08G 18/8064* (2013.01); *C08G 59/066* (2013.01); *C08G 59/245* (2013.01); *C08G 59/4028* (2013.01); *C08G 59/68* (2013.01); *C09D 5/4453* (2013.01); *C09D 5/4457* (2013.01); *C09D 7/40* (2018.01); *C09D 7/61* (2018.01); *C09D 163/00* (2013.01); *C09D 175/04* (2013.01); *C25D 13/12* (2013.01); *C08G 2150/90* (2013.01); *C08K 3/11* (2018.01); *C08K 3/24* (2013.01); *C08K 2003/0837* (2013.01); *C08K 2003/2227* (2013.01); *C25D 13/20* (2013.01)

(58) Field of Classification Search
None
See application file for complete search history.

(56) References Cited

U.S. PATENT DOCUMENTS

| | | |
|---|---|---|
| 5,330,839 A | 7/1994 | Yasuoka et al. |
| 6,156,823 A | 12/2000 | Sikora |
| 6,353,057 B1 | 3/2002 | He et al. |
| 2003/0158318 A1 | 8/2003 | Nakao et al. |
| 2004/0146716 A1 | 7/2004 | Lehmann et al. |
| 2005/0067284 A1* | 3/2005 | Nishiguchi ............ B05D 7/546 204/505 |
| 2007/0155916 A1 | 7/2007 | Chung |
| 2011/0094890 A1 | 4/2011 | Grosse Brinkhaus et al. |
| 2015/0267315 A1 | 9/2015 | Schiller et al. |

FOREIGN PATENT DOCUMENTS

| | | |
|---|---|---|
| CN | 101835852 | 9/2010 |
| JP | 04359973 | 12/1992 |
| JP | 4058841 B2 | 3/2008 |
| JP | 2012167150 | 9/2012 |
| JP | 2013056960 | 3/2013 |
| RU | 2415878 | 4/2011 |

(Continued)

OTHER PUBLICATIONS

International Search Report and Written Opinion for International Application No. PCT/US2016/017323 dated Jun. 14, 2016. 11 pages.

(Continued)

*Primary Examiner* — Kishor Mayekar
(74) *Attorney, Agent, or Firm* — Merchant & Gould P.C.

(57) ABSTRACT

An electrocoat system for electrodeposition is described. The system includes an inorganic bismuth-containing compound or a mixture of inorganic and organic bismuth-containing compounds. The system demonstrates a high degree of crosslinking and produces a cured coating with optimal crosslinking and corrosion resistance.

12 Claims, No Drawings

(56) References Cited

FOREIGN PATENT DOCUMENTS

| WO | 2004067651    | 8/2004 |
| WO | 2008082175    | 7/2008 |
| WO | 2014/031181 A1 | 2/2014 |
| WO | 2014074234    | 5/2014 |

OTHER PUBLICATIONS

"Catalysis of Blocked Isocyanates with Non-Tin Catalysts," Blank, Werner J. et al., King Industries, found at: http://www.wernerblank.com/pdfiles/paper18.pdf (last visited Oct. 26, 2017).
Extended European Search Report for application No. 16749788.2, dated Aug. 24, 2018 (7 pages).
Third Party Observations, Japanese Patent Appln. No. 2017-540864, dated Nov. 27, 2019 (english translation provided).

* cited by examiner

ELECTRODEPOSITION SYSTEM

CROSS-REFERENCE TO RELATED APPLICATIONS

This application is a continuation of International Application No. PCT/US2016/017323, filed 10 Feb. 2016 and entitled "Novel Electrodeposition System," which claims priority from U.S. Provisional Application No. 62/114,228, filed 10 Feb. 2015 and entitled "Catalyst for Cathodic Electrocoat System," each of which is incorporated herein by reference in its entirety.

BACKGROUND OF THE INVENTION

Coatings are typically applied to substrates to provide protective and/or decorative qualities. In particular, coatings are often applied to metal surfaces to inhibit or prevent corrosion.

One effective technique for applying coatings includes an electrocoating process, which typically involves depositing a composition onto an electrically conductive substrate with an applied electrical potential. Electrocoating is popular because it provides improved corrosion protection and low environmental contamination compared to other coating processes.

The process of electrocoating is well known in the art. Commercial electrocoating processes sometimes use anionic electrocoating processes, where the substrate being coated serves as the anode. However, cathodic or cationic electrocoating processes tend to provide coatings with superior corrosion resistance, and today are the most prevalent methods of electrocoating. For example, the vast majority of automotive primer coatings are now produced by cationic electrodeposition.

Highly crosslinked coatings are desirable for corrosion resistance as well as aesthetic appeal. Typically, such coatings are formed by a reaction between a crosslinkable functional group and a blocked isocyanate group. A catalyst is typically used to promote crosslinking reactions.

A variety of catalysts are known in the art. Organotin compounds, such as dibutyltin oxide (DBTO), dioctyltin oxide (DOTO), dibutyltin dilaurate (DBTDL), are among the known catalysts used in electrocoating. The most commonly used of these commercial catalysts is DBTO, a solid material that can be easily incorporated into an electrocoat composition. However, the human health risks and environmental issues associated with tin compounds are increasingly scrutinized. Organotin compounds, including DBTO, are sometimes considered pollutants, and there is increased regulatory pressure to substantially reduce or eliminate use of such compounds. Therefore, replacements for organotin compounds, and specifically dibutyl tin compounds like DBTO, for example, are being sought in electrocoat systems.

A wide variety of non-organotin catalysts may be used in electrocoat systems, although not all such catalysts are as effective as DBTO. Certain bismuth-containing compounds have been suggested as a replacement for organotin catalysts. For example, organic bismuth salts of carboxylic acids have been described as electrodeposition catalysts. These compounds are, however, liquid, hydrophobic and immiscible in water. As a result, they cannot be easily incorporated into the pigment paste of the electrocoat bath and tend to exude to the surface creating undesirable float in the electrocoat bath.

Various other bismuth-containing compounds have been proposed as catalysts for electrocoating processes. These include, for example, metallic bismuth, bismuth trioxide, organosulfur-based bismuth compounds, and the like, and are typically used in conjunction with other catalytic compounds like metallic zirconium, organotin compounds, or heterocyclic compounds like the mercapto-functional compounds.

From the foregoing, it will be appreciated that what is needed in the art is an effective catalyst for electrodeposition that is substantially or even completely free of organotin compounds but can be easily incorporated into an electrocoat bath without causing undesirable float problems or losing desirable cured film properties such as corrosion resistance. Such catalysts, compositions containing such catalysts, and methods for preparing and using the catalysts and compositions are disclosed and claimed herein.

SUMMARY

The present description provides a composition and a method for electrodeposition using an organotin-free cure catalyst. Preferred coatings formed from the electrodeposition composition described herein provide optimal crosslinking and performance characteristics, including enhanced corrosion resistance.

In one embodiment, the present description provides an electrodepositable composition that includes an inorganic bismuth-containing compound.

In another embodiment, the present description provides a composition for electrodeposition that includes an electrodeposition resin component, an optional crosslinking component, an optional carboxylic acid component, and an inorganic bismuth-containing compound.

In yet another embodiment, the present description provides a method including steps for combining an electrodeposition resin component that includes at least one crosslinkable functional group with a blocked isocyanate component, an aliphatic carboxylic acid component, and at least an inorganic bismuth-containing compound.

In yet another embodiment, the present description provides a method for using a cure catalyst. The method includes steps of providing a composition including an inorganic bismuth-containing compound as a cure catalyst, and providing instructions to a user to add the composition including the cure catalyst to an electrodeposition bath.

In yet another embodiment, the present description provides a method for electrodeposition of a coating on a substrate. The method includes steps for providing an emulsion including an electrodeposition resin component and a polyisocyanate component, along with a pigment paste that includes an inorganic bismuth-containing compound. The method further includes a step for mixing the emulsion with the pigment paste to provide an electrodeposition bath and a step to cathodically electrocoat a given substrate.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the accompanying drawings and the description below. Other features, objects, and advantages of the invention will be apparent from the description and drawings, and from the claims.

Selected Definitions

Unless otherwise specified, the following terms as used herein have the meanings as provided below.

The term "component" refers to any compound that includes a particular feature or structure. Examples of components include compounds, monomers, oligomers, polymers, and organic groups contained there.

The term "crosslinker" refers to a molecule capable of forming a covalent linkage between polymers or between two different regions of the same polymer. The term is used interchangeably with "crosslinking agent" or "crosslinking component."

The term "dispersion" in the context of a dispersible polymer refers to the mixture of a dispersible polymer and a carrier. The term "dispersion" is intended to include the term "solution."

The term "tin-containing compound" is used herein as a reference to various tin compounds including organotin compounds such as dibutyl tin oxide, for example, that are currently subject to regulatory concern, restriction or prohibition. "Tin-free" or "label-free" is used herein to indicate compounds that do not contain such compounds, although tin may still be present in other forms.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "electrodeposition," as used herein, refers to a process that uses electric current to reduce dissolved metal ions to form a coating on a metal substrate that acts as an electrode. Where the substrate forms the cathode, the process is known as cathodic electrodeposition. Where the substrate forms the anode, the process is known as anodic electrodeposition. The terms "electrocoating" and "electrocoat" are used interchangeably herein with "electrodeposition," and a composition or component that can be used for electrocoating is considered "electrodepositable."

The term "catalytic effect," or "catalytically effective," as used herein refers to the ability of a component in a coating composition to facilitate effective crosslinking of the composition. In this context, a catalytic effect exists when a cure response occurs. A better catalyst provides faster cure or cure at a lower cure temperature or both, relative to a control catalyst.

As used herein, the term "substantially insoluble" means that no more than about one percent by weight of a component dissolves in water at the normal pH and temperature conditions of an electrodeposition bath. "Generally insoluble" as used herein means that no more than 0.2 percent by weight of a component dissolves, while the term "completely insoluble" means that no more than 0.1 percent by weight of a component dissolves in water at the normal pH and temperature conditions of an electrodeposition bath.

Unless otherwise indicated, the term "polymer" includes both homopolymers and copolymers (i.e., polymers of two or more different monomers).

The term "comprises" and variations thereof do not have a limiting meaning where these terms appear in the description and claims.

The term "providing," as used herein, is intended broadly to include making available, supplying, or obtaining a component, substrate, part, or the like. The term may include manufacturing, but also obtaining via purchasing, supplying via sale, or other types of transfer of a component, substrate, part, or the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all sub-ranges included within the broader range (e.g., 1 to 5 discloses 1 to 4, 1.5 to 4.5, 1 to 2, etc.).

DETAILED DESCRIPTION

The present description provides an electrodepositable composition including an inorganic bismuth-containing compound. The composition may be used in any type of electrocoating process, including anodic and cathodic processes.

The present description provides compositions and methods for electrodeposition. The composition preferably includes an electrodeposition resin component, an optional polyisocyanate component, an optional acid-functional component, and at least an inorganic bismuth-containing compound. The method described herein preferably includes combining an emulsion including the electrodeposition resin component, together with any optional polyisocyanate and acid components, along with an inorganic bismuth containing compound, typically and preferably provided in a pigment paste. The method preferably further includes a step for mixing the emulsion with the pigment paste to provide an electrodeposition bath and a step to electrocoat a given substrate.

In an embodiment, the present description provides a composition for electrodeposition. The composition includes an electrodepositable resin component. In an aspect, the resin component is a resin having self-crosslinking or crosslinkable functionality. For example, the resin component may have hydroxyl, isocyanate, amine, epoxy, acrylate, vinyl, silane, carbamate, acetoacetate functionality, or any suitable combination of such functionality, and so on. In a preferred aspect, the resin has cationizable functionality, such as, for example, primary, secondary or tertiary amine functionality.

The process of electrocoating is well known in the art, and various aspects of the process are described in at least the following patents: U.S. Pat. Nos. 3,582,481; 3,761,371; 3,793,278; 3,922,253; 3,959,106; 3,962,165; 3,975,346; 3,990,953; 4,001,101; 4,017,438; 4,031,050; 4,064,028; 4,101,486; 4,180,442; 4,192,720; 4,383,073; 4,388,435; 4,416,752; 4,419,467; 4,432,850; 4,789,566; 4,559,393; 4,854,366; 4,879,325; 4,978,728; 5,794,979; 5,116,472; 5,152,880; 5,338,434; 5,582,704; 5,670,441; 6,013,167;

6,033,545; 6,207,731; 6,547,952; 6,662,588; 6,123,822; 6,353,057; 6,517,695; 8,137,804; 8,152,983, and the like.

The resin component may be an anodic component or a cathodic component. Anodic components are typically used when a coating is applied for decorative purposes, whereas cathodic components are typically used when optimal corrosion resistance is required. In a preferred aspect, the resin component is a cathodic component.

In an aspect, the resin component has a polymeric backbone. Suitable polymers for the polymeric backbone include, without limitation, epoxy resin, acrylics, polyolefins, polyurethanes, polyamines, alkyds, polyesters, and the like. Epoxy resins and acrylic resins are presently preferred.

In an aspect, the resin component is an acrylic resin, styrene-modified acrylic resin, or acrylic hybrid resin, more preferably a cathodic acrylic system. Any previously disclosed acrylic resin system for use in cathodic electrocoat compositions may be used herein. Systems of this type are further described in U.S. Pat. Nos. 3,582,481; 3,761,371; 3,990,953; 4,180,442; 4,192,720; 4,416,752; 4,854,366; 5,116,472; 5,152,880; 6,013,167; 6,033,545; 6,207,731; 6,547,952; and 6,662,588. Suitable commercial cathodic acrylics for use in the present invention include, without limitation, the resins used in the POWERCRON (PPG), ELECTROCLEAR (PPG), V-SHIELD (Valspar), VECTROGARD 700, (Valspar), and ACRONAL (BASF) line of products.

In a preferred aspect, the resin component is an epoxy resin, more preferably an amine-functional epoxy resin or aminated epoxy resin, even more preferably a cathodic epoxy system. Any previously disclosed amine-functional epoxy resin for use in cathodic electrocoat compositions may be used herein. For example, U.S. Pat. No. 4,031,050 describes electrodeposition resins which are the reaction products of an epoxy-based resin and primary or secondary amines. U.S. Pat. No. 4,017,438 describes reaction products of epoxy-based resins and blocked primary amines. U.S. Pat. Nos. 3,962,165; 3,975,346; 4,001,101 and 4,101,486 disclose cationic electrodeposition resins which are reaction products of an epoxy-based resin and tertiary amines. U.S. Pat. Nos. 3,959,106, and 3,793,278 describe cationic electrodeposition resins which are epoxy-based resins having sulfonium salt groups, and U.S. Pat. No. 4,383,073 describes cationic electrodeposition resins which are epoxy-based resins having carbamoylpyridinium salt groups. U.S. Pat. No. 4,419,467 discloses epoxy-based resins reacted with primary, secondary and tertiary amine groups as well as quaternary ammonium groups and ternary sulfonium groups.

Commercially available cathodic epoxy systems for use in the present invention include, without limitation, the resins used in the POWERCRON (PPG), FRAMECOAT (PPG), VECTROGARD 900 and VECTROGARD 950 (Valspar), AQUA EC 2000 and AQUA EC 3000 (Axalta) and CATHOGUARD line of products (BASF).

In an embodiment, the resin component is present in an amount of about 40 to 95, preferably about 55 to 80, and more preferably about 60 to 70 percent by weight, based on the total weight of resin solids in the electrodeposition composition.

In an aspect, the resin component is self-crosslinking, and in another aspect, the resin component is crosslinkable with an optional crosslinking agent reactive with the functional group(s) of the resin component.

Suitable optional crosslinking agents for use in the compositions and method described herein include, for example, aminoplast resins, polyisocyanates, polyepoxides, polyacids and polyamines, combinations or mixtures thereof, and the like.

In a preferred aspect, the crosslinking agent is a polyisocyanate. Examples of suitable polyisocyanates include, without limitation, aromatic, alicyclic, or aliphatic polyisocyanate compounds, preferably diisocyanate compounds such as toluene diisocyanate (TDI), xylylene diisocyanate (XDI), toluene xylylene diisocyanate (TMXDI), phenylene diisocyanate, tetramethylene diisocyanate, hexamethylene diisocyanate (HMDI), methylene diisocyanate, methylene diphenyl diisocyanate (MDI), isophorone diisocyanate (IPDI), isocyanate prepolymers, combinations or mixtures thereof, and the like. In a preferred aspect, the polyisocyanate used as a crosslinking agent for the resin component described herein is methylene diphenyl diisocyanate (MDI). Such crosslinkers are well known in the art, and are described in numerous patents including, for example, U.S. Pat. Nos. 3,894,922; 3,947,339; 3,984,299; 3,959,106; 4,017,438; 4,038,232; 4,031,050, 4,101,486; 4,134,816; 4,176,221; 4,182,831; 4,182,833; 4,225,478; 4,225,479; 4,260,697; 4,297,255; 4,310,646; 4,393,179; 4,339,369; 4,452,681; 4,452,930; and 4,452,963.

Preferred polyisocyanate crosslinking agents for use herein include a blocked polyisocyanate. Suitable blocking agents include, for example, (a) lactam compounds, such as ε-caprolactam, γ-caprolactam, etc., (b) oxime compounds, such as methyl ethyl ketoxime, etc., (c) phenols, such as phenol, p-t-butylphenol, cresol, etc., (d) aliphatic alcohols, such as butanol, 2-ethyl hexanol, etc., (e) active-hydrogen group-containing compounds including, for example, aromatic alcohols, such as phenyl carbitol, methyl phenyl carbitol, etc., dialkyl compounds such as diethyl malonate, dimethyl pyrazole, and the like, and (f) ether alcohols, and the like. In a preferred aspect, the polyisocyanate crosslinking agent used herein is blocked with alcohol.

In an embodiment, where the resin component is self-crosslinking, no additional crosslinking agent is required, but one or more crosslinking agents may still be used. In another embodiment, the crosslinking agent is present in an amount from about 10 to 60, preferably 20 to 45, and more preferably 30 to 40 percent by weight, based on the total weight of resin solids in the electrodeposition composition.

Compositions used in cathodic electrodeposition are often neutralized by the inclusion of an acid component. Accordingly, in an embodiment, the electrodeposition composition described herein includes an optional acid component, e.g., an inorganic or organic acid component. Any acid component known for use with electrodeposition systems may be used herein, but carboxylic acid-functional compounds are presently preferred. Suitable carboxylic acid-functional compounds include, for example, (i) aromatic acids, including benzoic acid, salicyclic acid, and mixtures or combinations thereof and the like; (ii) aliphatic acids, including formic acid, acetic acid, and the like; (iii) alpha-hydroxy acids such as lactic acid, glycolic acid, citric acid, and mixtures or combinations thereof, and the like. Examples of suitable acids are described in U.S. Pat. No. 6,190,524, for example. In a preferred aspect, the carboxylic acid-functional component is lactic acid.

In an embodiment, the optional carboxylic acid-functional component is present in an amount sufficient to neutralize the resin and provide a stable emulsion. In an aspect, the acid-functional component is preferably present in a 1:1 molar ratio to the neutralizable functionality in the resin, more preferably 0.5:1, more preferably 0.3:1.

The electrodeposition composition described herein further includes an organotin-free cure catalyst. Without limiting to theory, in some embodiments it is believed that a catalyst may help unblock the blocked polyisocyanate for crosslinking with crosslinkable functionality on the polymeric backbone of the resin component during the cure process (e.g., heating or baking to a temperature of about approximately 176° C.).

In an embodiment, suitable organotin-free catalysts for use in the compositions and methods described herein preferably include inorganic bismuth-containing compounds, preferably multivalent bismuth salts of various anions, more preferably bismuth salts of metal oxyanions. These compounds include their anhydrous forms, as well as various hydrates, including hemihydrate, pentahydrate and other hydrated forms, along with mixtures and combinations thereof, and the like.

Surprisingly, the inorganic bismuth-containing compound and demonstrates optimal dispersibility and catalytic activity. Moreover, unlike conventionally used bismuth carboxylates, the inorganic bismuth compounds described herein preferably do not exude or float to the surface of the bath during the electrodeposition process.

Suitable examples of such bismuth salts of various anions include, without limitation, bismuth silicate, bismuth magnesium aluminosilicate, bismuth aluminate, bismuth borate, bismuth manganate, bismuth phosphate, and the like. Bismuth hydroxide and bismuth trioxide may provide corrosion resistance benefit to an electrodeposition composition, but are not presently expected to provide catalytic effect on their own.

In a preferred aspect, the inorganic bismuth-containing compound is a bismuth salt of a metal oxyanion, such as, for example, bismuth aluminate, bismuth manganate, and mixtures or combinations thereof, and the like.

In an embodiment, suitable organotin-free catalysts preferably include inorganic bismuth-containing compounds that are solid at room temperature (25° C.). Examples of solid inorganic bismuth-containing compounds include, without limitation, bismuth silicate, bismuth magnesium aluminosilicate, bismuth aluminate, bismuth borate, bismuth manganate, bismuth phosphate, hydrates of the same, and the like.

In an embodiment, suitable organotin-free catalysts preferably include inorganic bismuth-containing compounds that are substantially insoluble, more preferably generally or completely insoluble, in water at the normal operating pH of a cathodic electrodeposition bath, i.e. pH of about 4 to 6, and at normal operating temperature of a cathodic electrodeposition bath, i.e. about 37° C. Examples of insoluble inorganic bismuth-containing compounds include, without limitation, bismuth aluminate, bismuth silicate, bismuth magnesium aluminosilicate, bismuth borate, bismuth manganate, bismuth phosphate, and mixtures or combinations thereof.

In an embodiment, suitable organotin-free catalysts preferably include inorganic bismuth-containing compounds that are white or colorless at the normal operating pH and temperature of a cathodic electrodeposition bath. Examples of white or colorless inorganic bismuth-containing compounds include, without limitation, bismuth magnesium aluminosilicate, bismuth aluminate, bismuth hydroxide, bismuth borate, bismuth phosphate, and the like.

In a preferred embodiment, the inorganic bismuth-containing compound is bismuth aluminate, more preferably bismuth aluminate hydrate, commercially available from various sources, including Sigma-Aldrich, for example. It should be noted that bismuth salts of metal oxyanions such as bismuth aluminate and bismuth aluminate hydrate, for example, may be associated with, or be partially converted to, small amounts of other inorganic bismuth-containing compounds, including bismuth trioxide and bismuth hydroxide, for example. While these materials may provide may provide corrosion resistance benefit to an electrodeposition composition, but are not presently expected to provide catalytic effect on their own.

In some embodiments, the inorganic bismuth-containing compound may be used in combination with one or more organic bismuth-containing compounds, and it is presently believed that previously disclosed organic bismuth-containing compounds for use in cathodic electrocoat compositions may optionally be used herein. Compounds of this type are described, for example, in U.S. Pat. Nos. 5,554,700; 5,631,214; 5,670,441; 5,859,165; 6,353,057; and 6,190,524.

Examples of optional organic bismuth-containing compounds include bismuth acetate, bismuth subacetate, bismuth carbonate, bismuth salicylate, bismuth subsalicylate, bismuth subcarbonate, bismuth subcitrate, bismuth citrate, bismuth benzoate, bismuth oxalate, bismuth oleate, bismuth dialkyldithiocarbamates, hydroxy acids of bismuth, organosulfur bismuth compounds, reaction products of bismuth with mercaptans and/or hydroxy mercaptans, mixtures or combinations thereof, and the like.

In some embodiments, the inorganic bismuth-containing compounds may be used in combination with an optional polyvalent metal catalyst, including, for example, metallic bismuth, zinc, cadmium, lead, iron, cobalt, nickel, barium, strontium, copper, zirconium, tin, chromium, and the like.

Where tin-free systems are not desired or required, the inorganic bismuth-containing compound may be used with conventional organotin compounds such as DBTO, DOTO, DBTL, or the like.

In an embodiment, the inorganic bismuth-containing compound is present in an amount of about 0.5 to 10, more preferably 0.6 to 5, and most preferably 0.8 to 2 percent by weight, based on the total weight of solids in the electrodeposition bath. If the inorganic bismuth-containing compound is used in conjunction or combination with an organic bismuth-containing compound or other catalyst, the inorganic bismuth-containing composition is present in a correspondingly reduced amount and supplemented with the organic bismuth-containing compound to a combined amount of preferably about 0.5 to 10, more preferably 0.6 to 5, and most preferably 0.8 to 0.2 percent by weight, based on the total weight of solids in the electrodeposition bath.

In an embodiment, the inorganic bismuth-containing compounds used herein may also function as effective corrosion inhibitors, either used alone or in combination with organic bismuth-containing compounds and/or other corrosion inhibitors known in the art. The use of inorganic bismuth-containing compounds as corrosion inhibitors is further described in Applicants' patent application No. 62/293,628 entitled "Corrosion Resistant Composition," filed on 10 Feb. 2017.

In an embodiment, a cured coating made from the electrodeposition composition and method described herein will demonstrate comparable corrosion resistance, preferably superior corrosion resistance, to conventional electrodeposited coatings made without the inorganic bismuth-containing compositions.

In various embodiments, the electrocoating compositions may also include one or more additional components, such as film-forming agents, solvents, coalescents, surfactants, wetting agents, defoaming agents, rheology-modifying agents, fillers, colorants (e.g., pigments and dyes), biocides, mildewcides, or other additives used to promote health and clarity of an electrodeposition bath, as described in U.S. Pat. Nos. 7,349,755 and 8,541,194, and Applicants' U.S. Provisional Application No. 62/164,870 (filed May 21, 2015), for example, and combinations or mixtures of the above components, and the like.

Examples of suitable film-forming agents include, without limitation, reaction products of methylphenol and propylene oxide, such as those commercially available under the trademark PARAPLEX (commercially available from Dow). Suitable concentrations of film-forming agents in the electrocoating composition range from preferably about 0.1 to 3, more preferably about 0.5 to 1 percent by weight, based on the total weight of solids in the electrodeposition composition.

Examples of suitable surfactants include, without limitation, acetylenic alcohols, such as those commercially available under the trademark "SURFYNOL®" surfactants (commercially available from Air Products), and combinations thereof. Examples of suitable wetting agents include, without limitation, alkyl imidazolines, such as those commercially available under the trademark "GEIGY AMINE C" surfactants (Ciba Specialty Chemicals). Suitable concentrations of surfactants and wetting agents in the electrocoating composition each independently range from about 0.1 to 2 percent by weight, with particularly suitable concentrations ranging from about 0.1 to 0.5 percent by weight, based on the total weight of solids the electrocoating composition.

Examples of suitable defoaming agents include, without limitation, the above-discussed surfactants and wetting agents, polysiloxane defoamers (e.g., methylalkylpolysiloxanes), and combinations thereof. Suitable concentrations of defoaming agents in the electrocoating composition range from about 0.1 to 2 percent by weight, with particularly suitable concentrations ranging from about 0.1 to 0.5 percent by weight, based on the total weight of solids the electrocoating composition.

Examples of suitable rheology-modifying agents include thixotropic materials. Suitable thixotropic materials include polyamides, oxidized polyethylenes, and combinations thereof. Examples of suitable commercially available thixotropic materials include those under the series "DISPARLON®" (King Industries, Inc., Norwalk, Conn.). Suitable concentrations of rheology-modifying agents in the electrocoating composition range from about 0.01 to 0.2 percent by weight, with particularly suitable concentrations ranging from about 0.01 to 0.1 percent by weight, based on the total weight of solids in the electrocoating composition.

Examples of suitable fillers include silicon dioxides, talc, wollastonites, mica, alumina trihydrates, clays, silica quartz, calcium carbonates, magnesium carbonates, barium carbonates, calcium sulfates, aluminum silicate, magnesium sulfates, and combinations thereof. Examples of suitable commercially available fillers include silicon dioxides under the trademark "AEROSIL®" (Evonik Industries AG), and silica quartz fillers under the series "BENTONE®" (Elementis-Specialties, Inc.).

Examples of suitable colorants for use in the electrocoating composition include pigments, such as iron oxides, lead oxides, zinc oxides, strontium chromate, copper chromium, carbon black, coal dust, titanium dioxide, lead silicate, barium sulfate, and combinations thereof.

Suitable amounts of pigments and/or fillers in the electrodeposition composition are included to provide a pigment:binder ratio of preferably less than about 0.5:1, more preferably 0.5:1 to 0.1:1, even more preferably 0.2:1 to 0.1:1.

In one embodiment, the present description provides a method for catalyzing the cure of an electrodeposition composition, including steps of providing a cationizable electrodeposition resin component, a blocked isocyanate component, an aliphatic carboxylic acid-functional component, and a cure catalyst including at least one inorganic bismuth-containing compound. In an aspect, the method described herein is used to coat substrates by a process of electrodeposition.

Any substrate previously described for use in electrocoating processes may be used herein. Suitable examples include, without limitation, cold rolled steel, cold rolled steel with zirconium, hot-dip galvanized steel, electrogalvanized steel, aluminum, zirconium, and the like. Typically and preferably, the substrate has a pretreatment applied prior to electrodeposition. Suitable pretreatments include, for example, iron phosphate pretreatment, zinc phosphate pretreatment, zirconium pretreatment, and the like. The pretreatment is typically rinsed with deionized water, and/or sealed with a chromate sealer, a non-chrome sealer, or a phosphate sealer, and the like.

Accordingly, in an embodiment, the method to coat a substrate by electrodeposition includes the steps of providing an emulsion including a cationizable electrodeposition resin component and a blocked polyisocyanate crosslinker component. A pigment paste, which preferably includes an optional dispersion resin, one or more pigments, and at least one inorganic bismuth-containing compound is also provided. The emulsion is then mixed with the pigment paste to form the electrodeposition composition. This composition is diluted with sufficient deionized water to form an aqueous dispersion that functions as an electrodeposition or electrocoating bath with a solid content of preferably 5 to 35, more preferably about 10 to 25, even more preferably 12 to 18 percent by weight, based on the total weight of solids in the electrocoating composition.

A substrate may be subjected to electrodeposition to form a coating on the substrate. This may involve placing an electrically conductive electrode (the anode in cathodic electrodeposition) in contact with the electrodeposition bath. The substrate is immersed in the bath and connected to an electrically conductive carrier, thereby allowing the substrate to function as an electrode (the cathode in cathodic electrodeposition). An electrical potential is then induced through the aqueous dispersion and the substrate, thereby depositing the electrocoating composition onto the substrate.

The electrocoating process may be performed for a duration sufficient to build a coating of the electrocoating composition to a desired thickness on the substrate, preferably about 5 to 50 micron (approx. 0.2 to 2 mil), more preferably about 10 to 40 micron (approx. 0.5 to 1.5 mil), and most preferably 20 to 30 micron (approx. 0.8 to 1.2 mil). The thickness of the coating may depend on a variety of factors, such as the composition of the electrocoating composition, the solids concentration of the aqueous dispersion, the surface area of the substrate, and the intensity of the electrical potential. Examples of suitable electrical potentials range from about 50 to 500 volts, with particularly suitable electrical potentials ranging from about 100 to 350 volts, typically and preferably at temperatures of 10 to 65° C., more preferably 20 to 40° C.

After the electrocoating process, the coated substrate may be rinsed to desirably remove any non-bonded portions of the electrocoating composition. Examples of suitable rinsing fluids include deionized water and/or a permeate filtered from the reaction vessel, which may include water, acid, solvent, ions, and low molecular weight resins. The coated substrate may then be heated to cure the coating. In one embodiment, the coated substrate may be placed in an oven maintained at an elevated temperature for a sufficient duration to cure the coating. The temperature is preferably high enough to remove the blocking agent from the optional isocyanate-functional compound, thereby allowing the epoxy-functional compound to crosslink with the isocyanate-functional compound. Examples of suitable temperatures for curing the electrocoating composition range from about 150° C. to 200° C., with particularly suitable temperatures ranging from preferably about 175° C. to 190° C., more preferably about 160° C. to 180° C. Examples of suitable durations for substantially curing the coating at the suitable and particularly suitable temperatures range from about 1 to 60 minutes, with particularly preferable durations ranging from about 5 to 50 minutes, more preferably about 10 to 45 minutes, and most preferably about 15 minutes to 30 minutes.

In one embodiment, the electrocoating process may be performed in a continuous manner, where the substrate may be run into, and out from, the reaction vessel during the electrocoating process. In this embodiment, the pigment paste part, the resin part, and the aqueous medium may be continuously or intermittently charged to the reaction vessel to maintain a desired concentration ratio. The successive portions of the substrate preferably have sufficient dwell times in the reaction vessel to form coatings having desired thicknesses. Examples of suitable dwell times for continuous electrocoating processes using the above-discussed operating conditions range from about 1 to 300 seconds, preferably 10 to 250 seconds, more preferably about 60 to 180 seconds, and most preferably from about 90 to 120 seconds. Furthermore, the rinsing and curing steps may also be performed in a continuous manner in a single assembly line, thereby reducing the time to form the coated articles.

In a preferred aspect, when used in the methods described herein to form an electrodeposited coating, the inorganic bismuth-containing compound demonstrates optimal catalytic effect, i.e. it facilitates faster cure or cure at a lower temperature, or both. To determine catalytic effect, the electrodeposited coating is assessed for solvent resistance according to the solvent double rub method of ASTM D5402-15, as further described below. Suitable coatings remain intact after at least 20, preferably at least 30, more preferably at least 40, and most preferably at least 50, and optimally at least about 100 double rubs.

In an embodiment, the electrodeposited coating made using the methods described herein demonstrates optimal corrosion resistance without the benefit of other corrosion inhibitors, although additional corrosion inhibitors may be used as desired.

In a preferred aspect, the electrodeposited coating made using the methods described herein demonstrates optimal corrosion resistance. Coated test panels are scribed to metal and exposed to salt fog according to the method of ASTM D1654-08, as further described below. Suitable coatings will demonstrate minimal paint loss or creep from scribe of preferably less than about 4 mm, more preferably less than about 3 mm, even more preferably less than 2 mm, and most preferably less than 1 mm. Commercially viable coatings generally have creep from scribe of less than 3 mm.

The resulting coated article desirably includes a coating that provides excellent corrosion protection and optimal smoothness, while also being an environmentally friendly tin-free system.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test Methods

Unless indicated otherwise, the following test methods were utilized in the Examples that follow.
Solvent Resistance Test
The extent of "cure" or crosslinking of a coating is measured as a resistance to solvents, such as methyl ethyl ketone (MEK). This test is performed as described in ASTM D 5402-15 (Standard Practice for Assessing the Solvent Resistance of Organic Coatings Using Solvent Rubs). For the test, electrodeposited films on test panels are tested one hour after cure, with the panels being tested at room temperature. The films have average film thickness of 25 μm and are applied on an iron-phosphate pretreated (with DI rinse) cold rolled steel substrate. The number of double-rubs (i.e., one back-and-forth motion) is reported.
Corrosion Resistance Test
The corrosion resistance of cured coatings prepared from the compositions described herein is tested by measuring creep after exposure to a corrosive environment, as described in ASTM D1654-08 (Standard Test Method for Evaluation of Painted or Coated Specimens Subjected to Corrosive Environments). For the test, electrodeposited films are tested one hour after cure, with the panels being tested at room temperature. The films have average film thickness of 25 μm and are applied on test panels of various different pretreated metal substrates. Each coated panel is scribed to metal and exposed to salt fog for a given period of time. Paint loss from the scribe is measured, and results are expressed as the amount of creep (in mm) from the scribe.

Example 1. Preparation of Emulsion (a) Preparation of Chain-Extended Polyepoxide
The following ingredients were charged into a reaction vessel equipped with a heating source, stirrer, and a reflux: 1439.4 parts of EPON 828 (epoxy resin having an epoxy equivalent weight of 188; Hexion Chemicals), 419.5 parts of SYNFAC 8009 (Bisphenol A polyol with hydroxy equivalent weight of 130; Dow Chemical). The charge was heated to 165° C. under a nitrogen blanket. 2.6 parts of dimethyl benzyl amine were added and the mixture was held at 165° C. for one hour. An additional 5.2 parts dimethyl benzyl amine were added and the mixture was held at 165° C. until an epoxy equivalent weight of 820 was obtained. 1333 parts of methyl isobutyl ketone (MIBK) solvent were added. The mixture was then cooled to 85° C. and 185.9 parts dimethanol amine, 100 parts MIBK and 67.3 parts diethylaminopropyl amine were added. The mixture was held at 120° C. for one hour, and 93 parts of MIBK were added. The resulting resin solution had a nonvolatile content of 62%.
(b) Preparation of Crosslinker Solution
A blocked polyisocyanate crosslinking resin solution was prepared by charging 862.0 parts of butyl cellosolve and 172.2 parts trimethylolpropane into a reaction vessel equipped as in Example 1. The mixture was heated to 60° C. and 1419 parts LUPRANATE 266 (low viscosity isocyanate; BASF) were carefully added to the mixture under a nitrogen blanket while keeping the reaction mixture below 90° C. 13.2 parts butyl cellosolve were then added and the mixture was held at 96° C. for two hours until essentially all the free isocyanate was consumed. Then 1038.4 parts MIBK were added. The resulting mixture had nonvolatile content of 70.0%.

(c) Preparation of Emulsion 1089.7 parts of the chain-extended polyepoxide from Example 1(a) are added to a stainless steel beaker, along with 642.8 parts of the crosslinker solution from Example 1(b), 3.6 parts SURFYNOL 104 (surfactant; Air Products), DOWANOL PPh solvent (glycol ether; Dow Chemical), and 64.8 parts of an 88% solution of lactic acid, and thoroughly mixed with a high speed air mixer. 2106 parts of deionized water were then added under agitation. The mixture was allowed to mix until a majority of the organic ketone had evaporated. The nonvolatile content of the resulting emulsion was adjusted to 36% using deionized water.

Example 2. Preparation of Pigment Paste (a) Preparation of Pigment Dispersing Resin A quarternizing agent was prepared by 356.6 parts dimethyl ethanolamine, to a half-capped toluene diisocyanate (TDI) made by mixing 80 parts MIBK with 696.8 parts TDI and 520 parts 2-ethyl hexanol in a suitable reaction vessel at room temperature. The mixture exothermed, and was stirred for one hour at 80° C. 400.9 parts lactic acid were then charged to the vessel followed by the addition of 156 parts butyl cellosolve. The reaction mixture was stirred for about one hour at 65° C. to form the desired quarternizing agent.

A pigment grind vehicle was prepared by charging 491 parts EPON 829 (diglycidyl ether of Bisphenol A; Hexion) and Bisphenol into a suitable reaction mixture under a nitrogen atmosphere. The reaction mixture was allowed to exotherm for about one hour at 150° C. to 160° C., then cooled to 120° C., followed by addition of the 2-ethyl hexanol half-capped TDI prepared above. The temperature of the reaction mixture was held at 110° C. to 120° C. for one hour, followed by the addition of butyl cellosolve. The reaction mixture was then cooled to 85° C., homogenized and charged with water, followed by the addition of the quarternizing agent prepared above. The temperature of the reaction mixture was held at 80° C. to 85° C., until an acid value of 1.0 was obtained. The resulting product has a nonvolatile content of 58%.

(b) Preparation of Pigment Paste #1

420.65 parts of the pigment dispersing resin from Example 2(a) at 53.2% nonvolatile content were charged to a suitable container along with 500.0 parts of deionized water, 5.54 parts SURFYNOL 104A (Air Products), 119.8 parts RAVEN 850 carbon black powder, 178.92 parts ASP (BASF), 170 parts aluminum silicate, and 110 parts of bismuth aluminate hydrate. The contents were mixed until homogenous, followed by dispersion in a horizontal media mill until a Hegman reading of seven was obtained. The resulting mater had nonvolatile content of 47.0%.

(c) Preparation of Pigment Paste #2

420.65 parts of the pigment dispersing resin from Example 2(a) at 53.2% nonvolatile content were charged to a suitable container along with 558.8 parts of deionized water, 5.54 parts SURFYNOL 104A (Air Products), 119.8 parts RAVEN 850 carbon black powder, 178.92 parts ASP (BASF), 170 parts aluminum silicate, 27 parts of bismuth aluminate hydrate, 37 parts bismuth citrate and 203 parts deionized water. The contents were mixed until homogenous, followed by dispersion in a horizontal media mill until a Hegman reading of seven was obtained. The resulting mater had nonvolatile content of 36.7%.

Example 3. Electrodeposition Bath and Coating #1

An electrocoat or electrodeposition bath is prepared by mixing 900 parts of the emulsion from Example 1 with 3340.8 parts of the pigment paste #1 of Example 2, along with 2759.2 parts deionized water in a 4.0 L beaker with low agitation. This bath was held at 32° C. and test panels of various substrates as shown in Table 2 were cathodically electrocoated at 200 volts for two minutes. The coated panels were then cured for 20 minutes at various different temperatures to provide film build of 0.65 mil (approx. 16 µm).

Example 4. Electrodeposition Bath and Coating #2

An electrocoat or electrodeposition bath is prepared by mixing 900 parts of the emulsion from Example 1 with 390 parts of the pigment paste #2 of Example 2, along with 2710 parts deionized water in a 4.0 L beaker with low agitation. This bath was held at 32° C. and test panels of various substrates as shown in Table 3 were cathodically electrocoated at 200 volts for two minutes. The coated panels where then cured for 20 minutes at various temperatures to provide a coating with film build of 0.65 mil (approx. 16 µm)

Example 5. Solvent Resistance

The coated panels from Examples 3 and 4 exhibited exceptional smoothness. To test cure performance, the coated panels were tested for solvent resistance using the MEK double rub method, along with control test panels coated with a composition using a standard DBTO catalyst. Results are shown in Table 2 as the number of MEK double rubs required for loss of paint. Panels coated with the coating of Examples 3 and 4 showed no loss of gloss or loss of paint. In addition, the cured film did not soften after one minute of soaking in MEK.

TABLE 1

Cure performance

| Bake temp (approx ° C.) | DBTO (Control) | Aluminate (Example 3) | Aluminate + Citrate (Example 4) |
|---|---|---|---|
| 190 | >100 | — | — |
| 180 | 100* | >100 | >100 |
| 174 | 55 | >100 | >100 |
| 168 | — | 100** | 100 |
| 163 | — | — | 100** |

*Severe mar
**Some mar

Example 6. Corrosion Resistance

The coated panels from Examples 3 and 4 were scribed and exposed to salt for 750 hours to evaluate corrosion resistance according to the method provided above. After 750 hours of salt fog exposure, the scribed panels were baked for 20 minutes at 180° C. The panels were then scraped and the creep from scribe was measured. The average creep from scribe for a minimum of five panels is shown in Table 2.

TABLE 2

| | Average creep from scribe | |
|---|---|---|
| Substrate | Aluminate (Example 3) | Aluminate +Citrate (Example 4) |
| | Average creep (mm) | |
| Iron phosphate-treated panel; DI rinse | 1.21 | 1.9 |
| Iron phosphate-treated panel; non-chromate | 1.19 | 2.34 |
| Zinc phosphate-treated panel; DI rinse | 0.77 | 0.97 |

The complete disclosure of all patents, patent applications, and publications, and electronically available material cited herein are incorporated by reference. The foregoing detailed description and examples have been given for clarity of understanding only. Unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A composition for electrodeposition, comprising:
an electrodeposition resin component; optionally, a crosslinking component;
optionally, an acid component; and
at least an inorganic bismuth salt of a metal oxyanion bismuth-containing compound comprising bismuth aluminate.

2. The composition of claim 1, wherein the at least one inorganic bismuth-containing compound is a compound substantially insoluble in water at a pH of about 4 to 6 and a temperature of about 37° C.

3. The composition of claim 1, wherein the composition includes a combination of the at least one inorganic bismuth-containing compound and an organic bismuth-containing compound comprising bismuth citrate.

4. The composition of claim 1, further comprising:
about 40 to 95 percent by weight of the electrodeposition resin component based on the total weight of resin solids in the composition;
about 10 to 60 percent by weight of the blocked polyisocyanate component based on the total weight of resin solids in the composition;
and
about 0.5 to 10 percent by weight of the at least one inorganic bismuth-containing compound based on the total weight of resin solids in the composition.

5. A method of making a coated article by electrodeposition of a film of the composition of claim 1.

6. The method of claim 5, wherein the film has an average thickness of 10 to 25 pm.

7. A cationic electrodeposition bath comprising the composition of claim 1.

8. The composition of claim 1, wherein a coating formed from the composition is corrosion resistant.

9. The composition of claim 1, wherein a coating formed from the composition demonstrates less than 3 mm creep from scribe according to ASTM D1654-08, wherein the coating is applied to a pretreated cold-rolled steel substrate.

10. The composition of claim 1, wherein a coating formed from the composition demonstrates solvent resistance of at least 30 double rubs according to ASTM D5402-15.

11. A method, comprising:
combining an electrodeposition resin component including at least one crosslinkable functional group with a blocked isocyanate component;
an aliphatic carboxylic acid component; and
at least an inorganic bismuth salt of a metal oxyanion bismuth-containing compound comprising bismuth aluminate.

12. A method for electrodeposition, comprising:
providing an emulsion including a cationizable electrodeposition resin component and a blocked polyisocyanate crosslinker component; providing a pigment paste including a dispersion resin, pigment, and an inorganic bismuth salt of a metal oxyanion bismuth-containing compound comprising bismuth aluminate.

* * * * *